United States Patent
Alagappan et al.

(10) Patent No.: US 10,157,234 B1
(45) Date of Patent: Dec. 18, 2018

(54) SYSTEMS AND METHODS FOR TRANSFORMING DATASETS

(71) Applicant: Dell Software Inc., Aliso Viejo, CA (US)

(72) Inventors: Kannan Alagappan, Irvine, CA (US); Jan Henrik Jonsson, Long Beach, CA (US)

(73) Assignee: Quest Software Inc., Aliso Viejo, CA (US)

( * ) Notice: Subject to any disclaimer, the term of this patent is extended or adjusted under 35 U.S.C. 154(b) by 536 days.

(21) Appl. No.: 14/633,826

(22) Filed: Feb. 27, 2015

(51) Int. Cl.
  *G06F 17/30* (2006.01)

(52) U.S. Cl.
  CPC .............................. *G06F 17/30876* (2013.01)

(58) Field of Classification Search
  CPC ....................................................... G06F 17/30
  See application file for complete search history.

(56) References Cited

U.S. PATENT DOCUMENTS

| | | | |
|---|---|---|---|
| 5,379,419 A | 1/1995 | Heffernan et al. | |
| 5,864,842 A | 1/1999 | Pederson et al. | |
| 6,640,221 B1 * | 10/2003 | Levine | G06F 17/30392 |
| 6,766,334 B1 | 7/2004 | Kaler et al. | |
| 7,162,464 B1 * | 1/2007 | Miller | G06F 17/30539 706/50 |
| 7,203,686 B1 | 4/2007 | Sinclair et al. | |
| 7,275,024 B2 | 9/2007 | Yeh et al. | |
| 7,421,427 B2 | 9/2008 | DeForeest et al. | |
| 7,647,298 B2 | 1/2010 | Adya et al. | |
| 7,657,516 B2 | 2/2010 | Zaman et al. | |
| 7,747,608 B1 | 6/2010 | Gheorghe et al. | |
| 2005/0091238 A1 | 4/2005 | Zane et al. | |
| 2006/0271568 A1 | 11/2006 | Balkir et al. | |
| 2008/0065592 A1 | 3/2008 | Doyle | |
| 2009/0132544 A1 | 5/2009 | Hattori | |
| 2009/0249125 A1 | 10/2009 | Bhatawdekar et al. | |
| 2009/0254916 A1 | 10/2009 | Bose et al. | |
| 2010/0017395 A1 | 1/2010 | Wayn et al. | |
| 2010/0049649 A1 | 2/2010 | Shepherd | |
| 2010/0049694 A1 | 2/2010 | Deffler | |

(Continued)

OTHER PUBLICATIONS

U.S. Appl. No 14/869,072, Jonsson et al.

(Continued)

*Primary Examiner* — Mark D Featherstone
*Assistant Examiner* — Tony Wu
(74) *Attorney, Agent, or Firm* — Winstead PC

(57) ABSTRACT

In one embodiment, a method includes receiving a data-transformation request in relation to a visualization of a first dataset, wherein the data-transformation request expresses at least one transformation of the first dataset without using Structured Query Language (SQL) syntax, wherein the visualization is characterized by a first SQL statement. In addition, the method includes automatically determining based, at least in part, on a mapping of the visualization to the first SQL statement, a second SQL statement operable to return a second dataset. Further, the method includes causing the second SQL statement to be executed on one or more databases. Moreover, the method includes receiving, in response to the causing, the second dataset. The method also includes updating the visualization to reflect the second dataset.

17 Claims, 14 Drawing Sheets

(56) References Cited

U.S. PATENT DOCUMENTS

| | | | |
|---|---|---|---|
| 2010/0121868 A1 | 5/2010 | Biannic et al. | |
| 2010/0153430 A1 | 6/2010 | Mordvinov et al. | |
| 2010/0161593 A1* | 6/2010 | Paulsen | G06F 3/0481 |
| | | | 707/722 |
| 2011/0082854 A1 | 4/2011 | Eidson et al. | |
| 2011/0161371 A1* | 6/2011 | Thomson | G06F 17/30398 |
| | | | 707/792 |
| 2011/0295833 A1* | 12/2011 | Narasayya | G06F 11/3664 |
| | | | 707/713 |
| 2013/0159974 A1* | 6/2013 | Norton | G06F 11/3684 |
| | | | 717/124 |
| 2013/0238658 A1* | 9/2013 | Burris | G06F 17/30545 |
| | | | 707/770 |

OTHER PUBLICATIONS

U.S. Appl. No. 14/073,822, Jonsson.
U.S. Appl. No. 13/098,298, Harrison.
NoSQL, a Relational Database Management System, http://www.strozzi.it/cgi-bin/CSA/tw7/I/en US/nosq1/Home%20Page 3 pages.
Perry, Geva, "How Cloud & Utility Computing Are Different", http://gigaom.com/2008/02/28/how-cloud-utility-computing-are-different/ 21 pages.
Understanding MySQL Internals Chapter 7 p. 119, 2007.
Browne, Julian, "Brewer's CAP Theorem", http://www.julianbrowne.com/article/viewer/brewers-cap-theorem 8 pages, Jan. 11, 2009.
Bouman, Ronald, My SQL 5.1 Plugins, http://rpbouman.blogspot.com/ pp. 1-15.
Amazon Elastic Compute Cloud Elasticfox, Getting Started Guide, Elasticfox Version 1.7-000108.
Quest Software, Toad for Data Analysts, 2009, 2 pages.
Harrison, Guy, Quest Software, "DBMS.next is the next DBMS revolution looming?", 6 pages.
Lai, Eric, "NO to SQL? Anti-database movement gains steam, but can enterprises take open-source alternatives Hadoop, Voldemort seriously?", Jul. 1, 2009, http://www.computerworld.com/s/article/print/9135086/No_to_SQL_Ant . . . 2 pages.
Shiers, Alan; "SQLeo Beginner Users Guide"; sqleo.sourceforge.net/guide/#_Toc327875425; Jun. 20, 2012; 37 pages.
Activedbsoft.; "Customizable SQL Query Building Environment: Simple and Clear Presentation of Database Structure and User Queries"; http://activequerybuilder.com/product_environment.html; Aug. 23, 2014; 3 pages.
Activedbsoft.; "Metadata Handling and Filtration: Various Ways to Load and Represent Metadata in Active Builder"; http://www.activequerybuilder.com/product_metadata.html; Jul. 14, 2014; 3 pages.
Activedbsoft.; "Programming API: Programmatic SQL Query Analysis and Modification"; http://activequerybuilder.com/product_api.html; Aug. 24, 2014; 3 pages.
Activedbsoft.; "Visual User Interface: Building Complex SQL Queries Visually Was Never Been So Easy"; http://activequerybuilder.com/product_ui.html; Aug. 23, 2014; 4 pages.
Activedbsoft.; "Active Query Builder: Visual SQL Query Builder Component"; http://activequerybuilder.com/product.html; Aug. 23, 2014; 4 pages.
Lount, Tina; "Alpine Overview"; https://alpine.atlassian.net/wiki/display/DOC/Alpine+Overview; Oct. 2, 2014; 2 pages.
Williams, Alex; "Alteryx Opens Big Data-Analytics Apps Studio for the Rest of Us"; http://techcrunch.com/2012/10/07/alteryx-opens-big-data-analytics-apps-studio-for-the-rest-of-us/; Oct. 7, 2012; 7 pages.
Devart; "Hands-Free Building of Queries with Query Builder"; http://www.devart.com/dbforge/mysql/studio/demostutorials/querybuilder.html; Aug. 12, 2014; 5 pages.
Activedbsoft.; "FlySpeed SQL Query"; http://www.activedbsoft.com/overview-querytool.html; Aug. 20, 2013; 3 pages.
"Graphical Query Builder"; http://pgadmin.org/docs/dev/gqb.html; May 26, 2013; 2 pages.
"Graphical Query Designer User Interface"; http://msdn.microsoft.com/en-us/library/ms365414.aspx; Jul. 17, 2013; 6 pages.
Grimes, Seth; "Lyzasoft's Non-Analytical Approach to Analytics"; http://www.informationweek.com/software/information-management/lyzasofts-non-analytical-approach-to-analytics/d/d-id/1072214?; Sep. 22, 2008; 6 pages.
Wikimedia Foundation, Inc.; "OpenRefine"; http://en.wikipedia.org/wiki/OpenRefine; last modified Nov. 11, 2014; 5 pages.
Standen, James; "Putting Data Analysis into the Hands of the Business User"; http://datamartist.com/data-analysis-for-the-business-user; Jul. 24, 2014; 3 pages.
"Query Tool"; http://pgadmin.org/docs/dev/query.html; Jul. 8, 2014; 5 pages.
Embarcadero Technologies, Inc.; "Embarcadero Rapid SQL User Guide" version 8.7.2/XE6; Dec. 2014; 1085 pages.
Kaldirimoglu, Devrim; "Springbok: Self-Service Data for Business Users"; Jun. 15, 2014; 2 pages.
Kandel, Sean; "Value of Data Transformation"; 2014; 5 pages.
Oracle; "Using Query Builder in Oracle SQL Develper 3.0" http://www.oracle.com/webfolder/technetwork/tutorials/obe/db/sqldev/r30/SQLdev3.0_Q . . . ; Dec. 15, 2013; 19 pages.
Datameer, Inc.; "What is Big Data Analytics?"; http://www.datameer.com/product/data-analytics.html; Jul. 4, 2014; 3 pages.
Harris, Derrick; "Why Trifacta is Teaching Humans and Data to Work Together"; Oct. 4, 2012; 9 pages.
Wikimedia Foundation, Inc.; "WYSIWYG"; http://en.wikipedia.org/wiki/WYSIWYG; last modified on Dec. 1, 2014; 6 pages.

* cited by examiner

FROM FIG. 6A

```
SELECT ADDRESS_ID AS ADDRESS_ID,
       ADDRESS AS ADDRESS,
       ADDRESS_LINE_2 AS ADDRESS_LINE_2,
       CITY AS CITY,
       STATE AS STATE,
       COUNTRY AS COUNTRY,
       POSTAL_CODE AS POSTAL_CODE,
       REGION_ID AS REGION_ID,
       FIRST_THOUSAND AS FIRST_THOUSAND
  FROM (SELECT ADDRESS_ID AS ADDRESS_ID,
               ADDRESS AS ADDRESS,
               ADDRESS_LINE_2 AS ADDRESS_LINE_2,
               CITY AS CITY,
               NVL (STATE, 'Unknown' ) AS STATE,
               COUNTRY AS COUNTRY,
               POSTAL_CODE AS POSTAL_CODE,
               REGION_ID AS REGION_ID,
               CASE WHEN ADDRESS_ID < 1000 THEN 'Y' ELSE 'N' END AS FIRST_THOUSAND
          FROM QUEST_DEV.ADDRESS data
         WHERE (COUNTRY = 'US')) qga1
 WHERE (FIRST_THOUSAND = 'Y')
```

FROM FIG. 6B

```
SELECT ADDRESS_ID AS ADDRESS_ID,
       ADDRESS AS ADDRESS,
       ADDRESS_LINE_2 AS ADDRESS_LINE_2,
       CITY AS CITY,
       STATE AS STATE,
       COUNTRY AS COUNTRY,
       POSTAL_CODE AS POSTAL_CODE,
       REGION_ID AS REGION_ID,
       FIRST_THOUSAND AS FIRST_THOUSAND,
       (SELECT AVG (REGION_ID)
           FROM (SELECT ADDRESS_ID AS ADDRESS_ID,
                        ADDRESS AS ADDRESS,
                        ADDRESS_LINE_2 AS ADDRESS_LINE_2,
                        CITY AS CITY,
                        STATE AS STATE,
                        COUNTRY AS COUNTRY,
                        POSTAL_CODE AS POSTAL_CODE,
                        REGION_ID AS REGION_ID,
                        FIRST_THOUSAND AS FIRST_THOUSAND
                   FROM (SELECT ADDRESS_ID AS ADDRESS_ID,
                                ADDRESS AS ADDRESS,
                                ADDRESS_LINE_2 AS ADDRESS_LINE_2,
                                CITY AS CITY,
                                NVL (STATE, 'Unknown') AS STATE,
                                COUNTRY AS COUNTRY,
                                POSTAL_CODE AS POSTAL_CODE,
                                REGION_ID AS REGION_ID,
                                CASE
                                    WHEN ADDRESS_ID < 1000 THEN 'Y'
                                    ELSE 'N'
                                END
                                    AS FIRST_THOUSAND
                           FROM QUEST_DEV.ADDRESS data
                          WHERE (COUNTRY = 'US')) qga1
                  WHERE (FIRST_THOUSAND = 'Y')) qga2) AS AVERAGE
  FROM (SELECT ADDRESS_ID AS ADDRESS_ID,
               ADDRESS AS ADDRESS,
               ADDRESS_LINE_2 AS ADDRESS_LINE_2,
               CITY AS CITY,
               NVL (STATE, 'Unknown') AS STATE,
               COUNTRY AS COUNTRY,
               POSTAL_CODE AS POSTAL_CODE,
               REGION_ID AS REGION_ID,
               CASE WHEN ADDRESS_ID < 1000 THEN 'Y' ELSE 'N' END
                   AS FIRST_THOUSAND
          FROM QUEST_DEV.ADDRESS data
         WHERE (COUNTRY = 'US')) qga1
 WHERE (FIRST_THOUSAND = 'Y')
```

| Group Column Step | SQL (All Steps) |

Group Column  [FIRST_THOUSAND ▼]

If  ADDRESS_ID  [IS]  [Less Than]  [1000 ▼]   Value is  [Y]
                                              Otherwise Value is  [N]

SYSTEMS AND METHODS FOR TRANSFORMING DATASETS

BACKGROUND

Technical Field

The present disclosure relates generally to databases and more particularly, but not by way of limitation, to systems and methods for transforming datasets.

History of Related Art

A database generally includes a collection of information or data organized in a way that computer programs can quickly access or select desired portions of the collection. A common type of database is the relational database, which stores data in logical structures called tables. Databases, including relational databases, can be accessed and modified using a database management system (DBMS). Several relational DBMS products are available from companies such as Oracle Corporation®, IBM®, and Microsoft® as well as from various open-source vendors. Particularly when dealing with multiple databases, it is sometimes necessary to transform and cleanse data before further data analysis can be performed. When working directly with the source database, transformation and cleansing typically requires extensive knowledge of querying syntax, which can restrict who performs such tasks as well as hinder data analysis.

Moreover, as the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

SUMMARY OF THE INVENTION

In one embodiment, a method is performed by a computer system. The method includes receiving a data-transformation request in relation to a visualization of a first dataset, wherein the data-transformation request expresses at least one transformation of the first dataset without using Structured Query Language (SQL) syntax, wherein the visualization is characterized by a first SQL statement maintained by the computer system. In addition, the method includes automatically determining based, at least in part, on a mapping of the visualization to the first SQL statement, a second SQL statement operable to return a second dataset, wherein the second dataset implements the at least one transformation of the first dataset. Further, the method includes causing the second SQL statement to be executed on one or more databases. Moreover, the method includes receiving, in response to the causing, the second dataset. The method also includes updating the visualization to reflect the second dataset.

In one embodiment, an information handling system includes at least one processor. The at least one processor is operable to implement a method. The method includes receiving a data-transformation request in relation to a visualization of a first dataset, wherein the data-transformation request expresses at least one transformation of the first dataset without using SQL syntax, wherein the visualization is characterized by a first SQL statement maintained by the information handling system. In addition, the method includes automatically determining based, at least in part, on a mapping of the visualization to the first SQL statement, a second SQL statement operable to return a second dataset, wherein the second dataset implements the at least one transformation of the first dataset. Further, the method includes causing the second SQL statement to be executed on one or more databases. Moreover, the method includes receiving, in response to the causing, the second dataset. The method also includes updating the visualization to reflect the second dataset.

In one embodiment, a computer-program product includes a non-transitory computer-usable medium having computer-readable program code embodied therein. The computer-readable program code is adapted to be executed to implement a method. The method includes receiving a data-transformation request in relation to a visualization of a first dataset, wherein the data-transformation request expresses at least one transformation of the first dataset without using SQL syntax, wherein the visualization is characterized by a first SQL statement maintained by a computer system. In addition, the method includes automatically determining based, at least in part, on a mapping of the visualization to the first SQL statement, a second SQL statement operable to return a second dataset, wherein the second dataset implements the at least one transformation of the first dataset. Further, the method includes causing the second SQL statement to be executed on one or more databases. Moreover, the method includes receiving, in response to the causing, the second dataset. The method also includes updating the visualization to reflect the second dataset.

BRIEF DESCRIPTION OF THE DRAWINGS

A more complete understanding of the method and apparatus of the present invention may be obtained by reference to the following Detailed Description when taken in conjunction with the accompanying Drawings wherein:

FIGS. 6A-C illustrate an example progression of SQL statements.

FIGS. 7-9 and 10A-B illustrate example formats of example SQL generation rules.

FIGS. 11-13 illustrate example visualizations of datasets.

DETAILED DESCRIPTION

Figure 1:
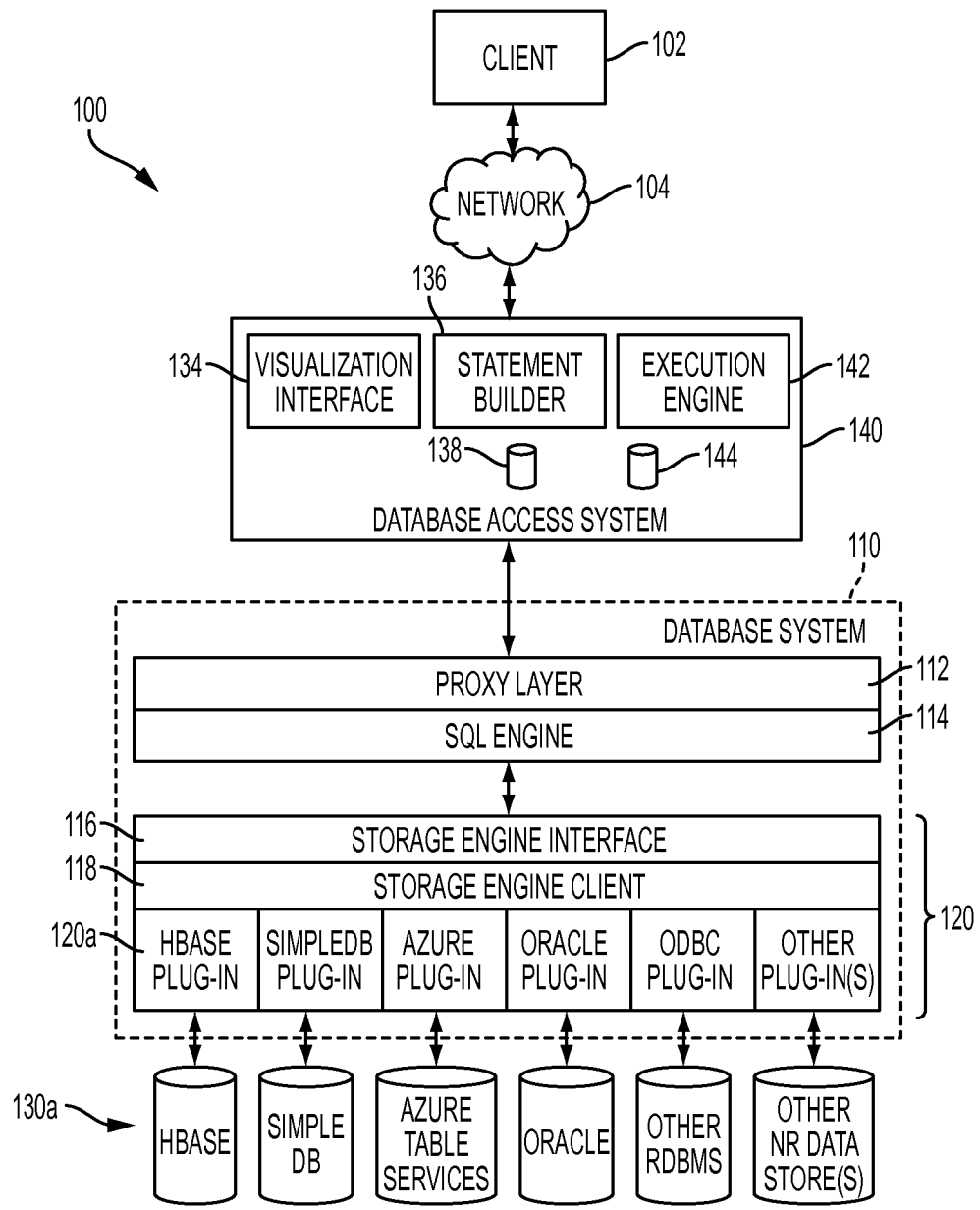
FIG. 1 illustrates an embodiment of a computing environment.

In certain embodiments, users can access databases of a database management system (DBMS) using database statements such as Structured Query Language (SQL) statements. In certain embodiments, database analysts, developers and other users may need to query, transform and cleanse data from multiple databases for purposes of performing data analysis or visualization. However, such tasks generally require the users to write statements using appropriate syntax expected by the DBMS, such as SQL syntax.

The ability to receive queries from users not familiar with the expected syntax of the DBMS, or from users who for efficiency purposes would prefer not to devise a query using the expected syntax, is a significant technical problem. Most query languages, such as SQL, rely on voluminous syntactical constraints to perform precise operations and transformations. In various cases, solving this technical problem is difficult due to the lack of user knowledge regarding, for example, the expected syntax, the concepts represented by the expected syntax, and the organization of data, among numerous other factors. In certain embodiments, solving the technical problem involves not only figuring out how to translate amorphous user input into usable elements of a syntactically correct database statement but also dealing with the lack of information, often unknown to the user, which is necessary to achieve the precision of a syntactically correct database statement.

One way to approach the above problem would be to utilize a query builder that shows users, for example, a diagram of tables in connection with a SQL syntax grid or toolbar which includes exact SQL equivalents such as, for example, alias, aggregate, sort, filter, etc. According to this approach, database statements might be built. Somewhat disadvantageously, however, this approach would offload to the users the difficulty of identifying what SQL syntax corresponds to what transformations or operations. Stated somewhat differently, this approach would amount to the users building their own SQL statements by providing piecemeal SQL syntax selections, under the guise of graphical query building. Extensive SQL knowledge would be a prerequisite to using a machine-user interface of this type.

Another way to approach the above problem would be to effectively eliminate database statements, such as SQL statements, in favor of spreadsheet-style manipulation of data. According to this approach, data from one or more databases might be imported into what is, in effect, a spreadsheet, for user manipulation. While this approach might simplify data manipulation for non-technical users, the elimination of database syntax generally results in a software tool that relies upon its own simplified representation of data. Although transformations of data and other manipulations might be manifested in a spreadsheet visualization shown to a user and/or maintained internally in the software tool, relationships to underlying data in the databases, and the overall precision and re-usability of a database syntax such as SQL on updated or similar datasets, might be lost.

The present disclosure describes examples of automatically determining database statements from user input. In certain embodiments, a database access system can generate graphical representations, such as tabular representations (e.g., a table), of a dataset retrieved from one or more databases. In certain embodiments, the database access system can allow a user to iteratively indicate transformations of the dataset without having to specify, or select, elements of an applicable database syntax. In corresponding fashion, the database access system can iteratively determine or generate database statements that represent each indicated transformation. In addition, in various embodiments, the database access system can map constituent parts of the graphical representation to specific elements of the database statement so as to facilitate additional transformations. Advantageously, in certain embodiments, the iteratively determined database statements can enable maintenance, through each data transformation, of both data consistency and relationships with underlying data in the databases.

Data transformations as described herein can include, for example, any change or update to all or a portion of a dataset. For example, in certain embodiments, data transformations can include blending multiple data sources, appending a dataset to another dataset, filtering, sorting, find-and-replace operations, calculations or combinations that result in a new column based on one or more other columns, column splitting, data-type changes, formatting changes, trimming, transposing, pivoting, extractions, data summarizations, combinations of same, and/or the like.

For illustrative purposes, various examples will be provided below relative to SQL. For purposes of this patent application, SQL is used in its broad sense to include, for example, custom variants of SQL. Examples of variants of SQL are described in U.S. patent application Ser. No. 14/073,822, which application is hereby incorporated by reference. Although examples using SQL may be provided below, it should be appreciated that the principles described herein are not so limited. For example, similar principles could be applied to other query languages which rely on particular syntax to achieve precision of data transformations.

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

FIG. 1 illustrates an embodiment of a computing environment 100 for determining database statements from user input. In the depicted embodiment, the computing environment 100 includes a client 102, a database access system 140, and a database system 110. The client 102, the database access system 140, and the database system 110 can be implemented on the same or different computing machines. In general, the client 102, the database access system 140, and the database system 110 can each include one or more information handling systems. An example of an information handling system will be described in relation to FIG. 2.

In one embodiment, the client 102 accesses the database access system 140 over a network 104 such as a LAN or a WAN (e.g., the Internet). The client 102 can be implemented in one or more physical computing machines. For example, the client 102 can be an information handling system such as a desktop, laptop, tablet, wireless handheld device (such as a smartphone or PDA), wearable or body-borne computer, and/or the like. The client 102 can include software for enabling a user to interact with the database access system 140. As shown, the client 102 communicates with the database access system 140.

The database access system 140 can generate one or more user interfaces that enable the user to access the database system 110 and transform data thereof. For illustrative purposes, the database access system 140 is shown to include a visualization interface 134, a statement builder 136, an execution engine 142, a statement repository 138, and a rules repository 144. The visualization interface 134 generally includes functionality to enable a user of the client 102 to view, and select data transformations of, a dataset. In certain cases, the dataset can be characterized by a database statement established using SQL.

In some embodiments, the data transformations can be selected via spreadsheet-style manipulation. For example, in various cases, users can use a graphical user interface provided by the visualization interface 134 to blend multiple data sources, append a dataset to another dataset, filter based on one or more values, sort data, find-and-replace operations (e.g., values, formatting, etc.), calculations or combinations that result in a new column based on one or more other columns, column splitting, data-type changes, formatting changes, trimming, transposing, pivoting, extractions, data summarizations, combinations of same, and/or the like. In some embodiments, the operations can be selected via graphical table manipulation in a spreadsheet-like fashion, toolbar or ribbon selections, combinations of same and/or the like. More detailed examples will be provided relative to the ensuing FIGURES.

In a typical embodiment, the statement builder 136 serves as a tool to determine, or build, a database statement that is usable to return a dataset. In the illustrated embodiment, the statement builder 136 is operable to determine or build SQL statements. In some embodiments, the SQL statements can be built using rules stored in the rules repository 144. Examples will be described with respect to the ensuing FIGURES. In certain embodiments, some or all of the SQL statements determined or built by the statement builder 136, and information relating thereto (e.g., visualizations, metadata, etc.), can be stored in the statement repository 138. Additionally, in certain embodiments, the statement repository 138 can include information related to some or all data transformations performed on the computing environment 100.

The execution engine 142 is operable to cause database statements to be executed, for example, by passing the database statements to the database system 110. It should be appreciated that the functionality of the visualization interface 134, the statement builder 136, and the execution engine 142 can be combined into a single component, redistributed among the same, fewer, or additional components, and/or the like. Example operation of the database access system 140 will be described in greater detail with respect to FIGS. 3-13.

In one embodiment, the database system 110 includes one or more servers, which may be geographically co-located or geographically dispersed (e.g., in different data centers). The database system 110 can also be implemented using one or more virtual machines. The database system 110 (and/or the database access system 140) can also be implemented in a shared resources environment, such as a cloud computing environment or the like. For example, the database system 110 can be implemented as a machine instance or virtual machine running on a cloud computing platform, such as the Amazon Elastic Computer Cloud (EC2) provided by Amazon Web Services™. Example operation of the database system 110 is described in detail in U.S. patent application Ser. No. 13/098,298, which application is hereby incorporated by reference.

In certain embodiments, the database system 110 includes features for mapping non-relational data stores (130*a*) to a relational schema. Once a data store 130*a* has been mapped, the database system 110 can translate SQL statements received from the execution engine 142 into a format for accessing the data store 130*a*. As shown, the database system 110 includes a proxy layer 112, a SQL engine 114, and a storage engine 120 including several plug-ins 120*a*. In the depicted embodiment, the execution engine 142 can access the database system 110 through the proxy layer 112. In certain embodiments, the proxy layer 112 pre-processes SQL statements received from the execution engine 142. For example, the proxy layer 112 may split or divide a SQL statement that accesses multiple back-end data sources into separate queries tailored for each specific source. The proxy layer 112 can also analyze each query in order to determine query optimizations that may improve performance. The proxy layer 112 can also perform certain dynamic, on-the-fly processing functions.

In certain embodiments, the proxy layer 112 provides pre-processed SQL statements to a SQL engine 114. The SQL engine 114 can be a module that generates a query execution plan for each SQL statement. The query execution plan can include information on what algorithm to use to execute the SQL statement, which indices to access, and so forth. From this execution plan, the SQL engine 114 generates a set of execution plan instructions. The SQL engine 114 can provide these execution plan instructions to the storage engine 120 via a storage engine interface.

The storage engine 120 can be a module that communicates with one or more back-end data stores 130*a*, such as non-relational data stores. A storage engine interface 116 of the storage engine 120 can include an API that allows the SQL engine 114 to communicate the execution plan instructions to the data stores 130*a*. The storage engine 120 also includes a storage engine client 118 that provides access to configuration data about the data stores 130*a*. Configuration data stored by the storage engine client 118 can include connectivity information regarding how to connect to a data store 130*a*. This connectivity information can include, for example, network connectivity information such as IP address, URL, port, and so forth, web service interface information (such as SOAP, XML, and/or WSDL interfaces), and the like. Further, the configuration data can reflect the data store(s) 130*a* that each plug-in 120*a* communicates with. When a plug-in 120*a* is initially added to the database system 110, the storage engine 120 can provide functionality for the plug-in 120*a* to register with the storage engine client 118 to establish this configuration data.

In one embodiment, the storage engine client 118 receives the execution plan instructions from the storage engine interface 116 and selects one or more plug-ins 120a to send the instructions to based on the configuration data. The plug-in 120a can then translate the instructions into one or more API calls, other remote procedure calls, web service calls, REST calls, or the like to one or more data stores 130a.

Several plug-ins 120a are shown in FIG. 1. Each plug-in 120a can be designed to communicate with one or more different data stores 130a. Some example non-relational data stores 130a are shown, including Apache™ Hadoop HBase, Amazon® SimpleDB™, and Azure Table Services™. Other examples of non-relational data stores that may be included in certain implementations can include, among others, HyperTable, MongoDB, CouchDB, MemcacheDB, Megastore/GAE, Cassandra, Voldemort, Tokyo Cabinet, Dynamo, Dynamite, BigTable, Scalaris, Persevere, and Redis. The non-relational data store 130a can also include business intelligence data sources, file systems, flat file databases, or other data repositories.

Certain plug-ins 120a can also communicate with relational databases. For example, a plug-in 120a is shown for communicating with Oracle. An ODBC plug-in 120a can also be provided for communicating with other relational databases via the Open Database Connectivity (ODBC) API. By providing functionality for communicating with relational databases as well as non-relational data stores, the plug-ins 120a can facilitate merging, joining, exporting, or combining data from both relational and non-relational data sources. As shown, additional (or fewer) plug-ins 120a to other data stores 130a can also be provided.

In one embodiment, the database system 110 includes some or all the features of the MySQL® RDBMS. The plug-ins 120a can therefore be table handlers and/or storage engines that interface with the MySQL® engine. However, the database system 110 is not limited to MySQL® implementations and can be used in conjunction with other database management systems, such as PostgreSQL™ (also known as Postgres), or as a stand-alone database system independent of any currently-available commercial or non-commercial database platforms.

The example database system 110 architecture shown can also be varied considerably in other implementations. For example, the database system 110 could map one or more non-relational and/or relational data stores to one or more relational tables without employing a plug-in or storage engine architecture. The proxy layer 112 may also likewise be optional in some embodiments.

Figure 2:
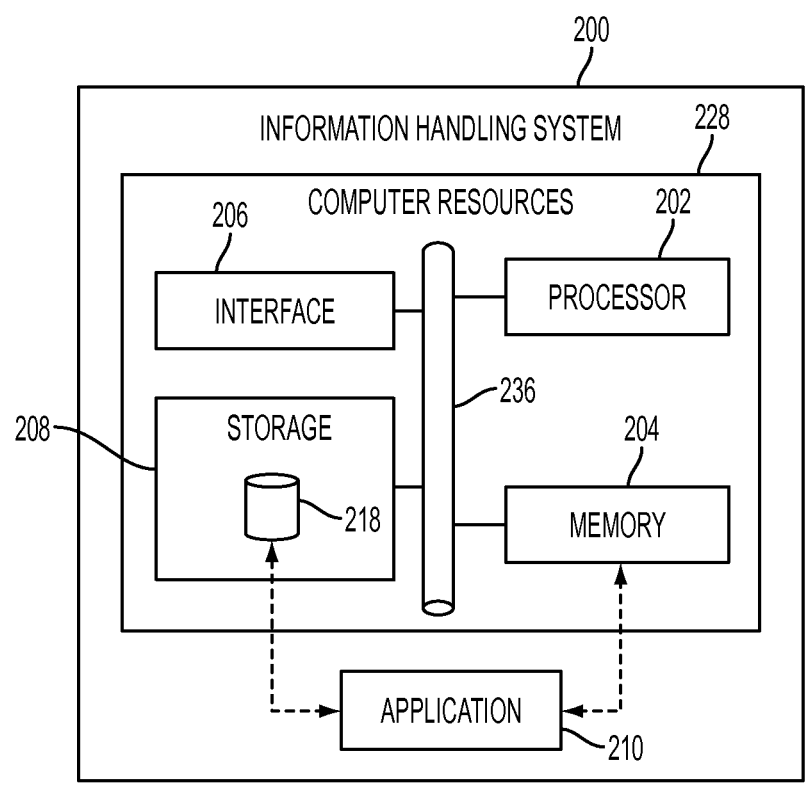
FIG. 2 illustrates an example of an information handling system.

FIG. 2 illustrates an example of an information handling system 200. In various embodiments, one or more information handling systems similar to the information handling system 200 can be included, for example, within the client 102, the database access system 140, the database system 110, computer systems communicating with any of the foregoing, and/or the like. The information handling system 200 includes an application 210 operable to execute on computer resources 228. In particular embodiments, one or more instances of the information handling system 200 may perform one or more steps of one or more methods described or illustrated herein. In particular embodiments, one or more computer systems may provide functionality described or illustrated herein. In particular embodiments, encoded software running on one or more computer systems may perform one or more steps of one or more methods described or illustrated herein or provide functionality described or illustrated herein.

The components of the information handling system 200 may comprise any suitable physical form, configuration, number, type and/or layout. As an example, and not by way of limitation, the information handling system 200 may comprise an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a wearable or body-borne computer, a server, or a combination of two or more of these. Where appropriate, the information handling system 200 may include one or more computer systems; be unitary or distributed; span multiple locations; span multiple machines; or reside in a cloud, which may include one or more cloud components in one or more networks. For example, in certain embodiments, all or part of the database access system 140 and/or the database system 110 can reside in a cloud.

In the depicted embodiment, the information handling system 200 includes a processor 202, memory 204, storage 208, interface 206, and bus 236. Although a particular information handling system is depicted having a particular number of particular components in a particular arrangement, this disclosure contemplates any suitable information handling system having any suitable number of any suitable components in any suitable arrangement.

Processor 202 may be a microprocessor, controller, or any other suitable computing device, resource, or combination of hardware, software and/or encoded logic operable to execute, either alone or in conjunction with other components, (e.g., memory 204), the application 210. Such functionality may include providing various features discussed herein. In particular embodiments, processor 202 may include hardware for executing instructions, such as those making up the application 210. As an example and not by way of limitation, to execute instructions, processor 202 may retrieve (or fetch) instructions from an internal register, an internal cache, memory 204, or storage 208; decode and execute them; and then write one or more results to an internal register, an internal cache, memory 204, or storage 208.

In particular embodiments, processor 202 may include one or more internal caches for data, instructions, or addresses. This disclosure contemplates processor 202 including any suitable number of any suitable internal caches, where appropriate. As an example and not by way of limitation, processor 202 may include one or more instruction caches, one or more data caches, and one or more translation lookaside buffers (TLBs). Instructions in the instruction caches may be copies of instructions in memory 204 or storage 208 and the instruction caches may speed up retrieval of those instructions by processor 202. Data in the data caches may be copies of data in memory 204 or storage 208 for instructions executing at processor 202 to operate on; the results of previous instructions executed at processor 202 for access by subsequent instructions executing at processor 202, or for writing to memory 204, or storage 208; or other suitable data. The data caches may speed up read or write operations by processor 202. The TLBs may speed up virtual-address translations for processor 202. In particular embodiments, processor 202 may include one or more internal registers for data, instructions, or addresses. Depending on the embodiment, processor 202 may include any suitable number of any suitable internal registers, where appropriate. Where appropriate, processor 202 may include one or more arithmetic logic units (ALUs); be a multi-core processor; include one or more processors 202; or any other suitable processor.

Memory 204 may be any form of volatile or non-volatile memory including, without limitation, magnetic media, optical media, random access memory (RAM), read-only memory (ROM), flash memory, removable media, or any other suitable local or remote memory component or components. In particular embodiments, memory 204 may include random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM, or any other suitable type of RAM or memory. Memory 204 may include one or more memories 204, where appropriate. Memory 204 may store any suitable data or information utilized by the information handling system 200, including software embedded in a computer readable medium, and/or encoded logic incorporated in hardware or otherwise stored (e.g., firmware). In particular embodiments, memory 204 may include main memory for storing instructions for processor 202 to execute or data for processor 202 to operate on. In particular embodiments, one or more memory management units (MMUs) may reside between processor 202 and memory 204 and facilitate accesses to memory 204 requested by processor 202.

As an example and not by way of limitation, the information handling system 200 may load instructions from storage 208 or another source (such as, for example, another computer system) to memory 204. Processor 202 may then load the instructions from memory 204 to an internal register or internal cache. To execute the instructions, processor 202 may retrieve the instructions from the internal register or internal cache and decode them. During or after execution of the instructions, processor 202 may write one or more results (which may be intermediate or final results) to the internal register or internal cache. Processor 202 may then write one or more of those results to memory 204. In particular embodiments, processor 202 may execute only instructions in one or more internal registers or internal caches or in memory 204 (as opposed to storage 208 or elsewhere) and may operate only on data in one or more internal registers or internal caches or in memory 204 (as opposed to storage 208 or elsewhere).

In particular embodiments, storage 208 may include mass storage for data or instructions. As an example and not by way of limitation, storage 208 may include a hard disk drive (HDD), a floppy disk drive, flash memory, an optical disc, a magneto-optical disc, magnetic tape, or a Universal Serial Bus (USB) drive or a combination of two or more of these. Storage 208 may include removable or non-removable (or fixed) media, where appropriate. Storage 208 may be internal or external to the information handling system 200, where appropriate. In particular embodiments, storage 208 may be non-volatile, solid-state memory. In particular embodiments, storage 208 may include read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. Storage 208 may take any suitable physical form and may comprise any suitable number or type of storage. Storage 208 may include one or more storage control units facilitating communication between processor 202 and storage 208, where appropriate. In addition, in certain embodiments, the application 210 is operable to establish, or update, configurations in a data store 218 on the storage 208. The data store 218 can be a database, flat file, and/or the like. The configurations can include, for example, rules, database statements, preconfigured visualizations, and/or other information related to transforming a dataset.

In particular embodiments, interface 206 may include hardware, encoded software, or both providing one or more interfaces for communication (such as, for example, packet-based communication) among any networks, any network devices, and/or any other computer systems. As an example and not by way of limitation, communication interface 206 may include a network interface controller (NIC) or network adapter for communicating with an Ethernet or other wire-based network and/or a wireless NIC (WNIC) or wireless adapter for communicating with a wireless network.

Depending on the embodiment, interface 206 may be any type of interface suitable for any type of network for which information handling system 200 is used. As an example and not by way of limitation, information handling system 200 can include (or communicate with) an ad-hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, information handling system 200 can include (or communicate with) a wireless PAN (WPAN) (such as, for example, a BLUETOOTH WPAN), a WI-FI network, a WI-MAX network, an LTE network, an LTE-A network, a cellular telephone network (such as, for example, a Global System for Mobile Communications (GSM) network), or any other suitable wireless network or a combination of two or more of these. By way of further example, the interface 206 can utilize communication via various other types of wireless communication such as infrared (IR) communication, radio frequency (RF) communication, communication via direct electrical connections, etc. In general, the information handling system 200 may include any suitable interface 206 for any one or more of these networks, where appropriate.

In some embodiments, interface 206 may include one or more interfaces for one or more I/O devices. One or more of these I/O devices may enable communication between a person and the information handling system 200. As an example and not by way of limitation, an I/O device may include a keyboard, keypad, microphone, monitor, mouse, printer, scanner, speaker, still camera, stylus, tablet, touchscreen, trackball, video camera, another suitable I/O device or a combination of two or more of these. An I/O device may include one or more sensors. Particular embodiments may include any suitable type and/or number of I/O devices and any suitable type and/or number of interfaces 206 for them. Where appropriate, interface 206 may include one or more drivers enabling processor 202 to drive one or more of these I/O devices. Interface 206 may include one or more interfaces 206, where appropriate.

Bus 236 may include any combination of hardware, software embedded in a computer readable medium, and/or encoded logic incorporated in hardware or otherwise stored (e.g., firmware) to couple components of the information handling system 200 to each other. As an example and not by way of limitation, bus 236 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCI-X) bus, a serial advanced technology attachment (SATA) bus, a Video Electronics Standards Association local (VLB) bus, or any other suitable bus or a combination of two or more of these. Bus 236 may include any number, type, and/or configuration of buses 236, where appropriate. In particular embodiments, one or more buses 236 (which may each include an address bus and a data bus) may couple processor 202 to memory 204. Bus 236 may include one or more memory buses.

Herein, reference to a computer-readable storage medium encompasses one or more tangible computer-readable storage media possessing structures. As an example and not by way of limitation, a computer-readable storage medium may include a semiconductor-based or other integrated circuit (IC) (such, as for example, a field-programmable gate array (FPGA) or an application-specific IC (ASIC)), a hard disk, an HDD, a hybrid hard drive (HHD), an optical disc, an optical disc drive (ODD), a magneto-optical disc, a magneto-optical drive, a floppy disk, a floppy disk drive (FDD), magnetic tape, a holographic storage medium, a solid-state drive (SSD), a RAM-drive, a SECURE DIGITAL card, a SECURE DIGITAL drive, a flash memory card, a flash memory drive, or any other suitable tangible computer-readable storage medium or a combination of two or more of these, where appropriate.

Particular embodiments may include one or more computer-readable storage media implementing any suitable storage. In particular embodiments, a computer-readable storage medium implements one or more portions of processor 202 (such as, for example, one or more internal registers or caches), one or more portions of memory 204, one or more portions of storage 208, or a combination of these, where appropriate. In particular embodiments, a computer-readable storage medium implements RAM or ROM. In particular embodiments, a computer-readable storage medium implements volatile or persistent memory. In particular embodiments, one or more computer-readable storage media embody encoded software.

Herein, reference to encoded software may encompass one or more applications, bytecode, one or more computer programs, one or more executables, one or more instructions, logic, machine code, one or more scripts, or source code, and vice versa, where appropriate, that have been stored or encoded in a computer-readable storage medium. In particular embodiments, encoded software includes one or more application programming interfaces (APIs) stored or encoded in a computer-readable storage medium. Particular embodiments may use any suitable encoded software written or otherwise expressed in any suitable programming language or combination of programming languages stored or encoded in any suitable type or number of computer-readable storage media. In particular embodiments, encoded software may be expressed as source code or object code. In particular embodiments, encoded software is expressed in a higher-level programming language, such as, for example, C, Python, Java, or a suitable extension thereof. In particular embodiments, encoded software is expressed in a lower-level programming language, such as assembly language (or machine code). In particular embodiments, encoded software is expressed in JAVA. In particular embodiments, encoded software is expressed in Hyper Text Markup Language (HTML), Extensible Markup Language (XML), or other suitable markup language.

Figure 3:
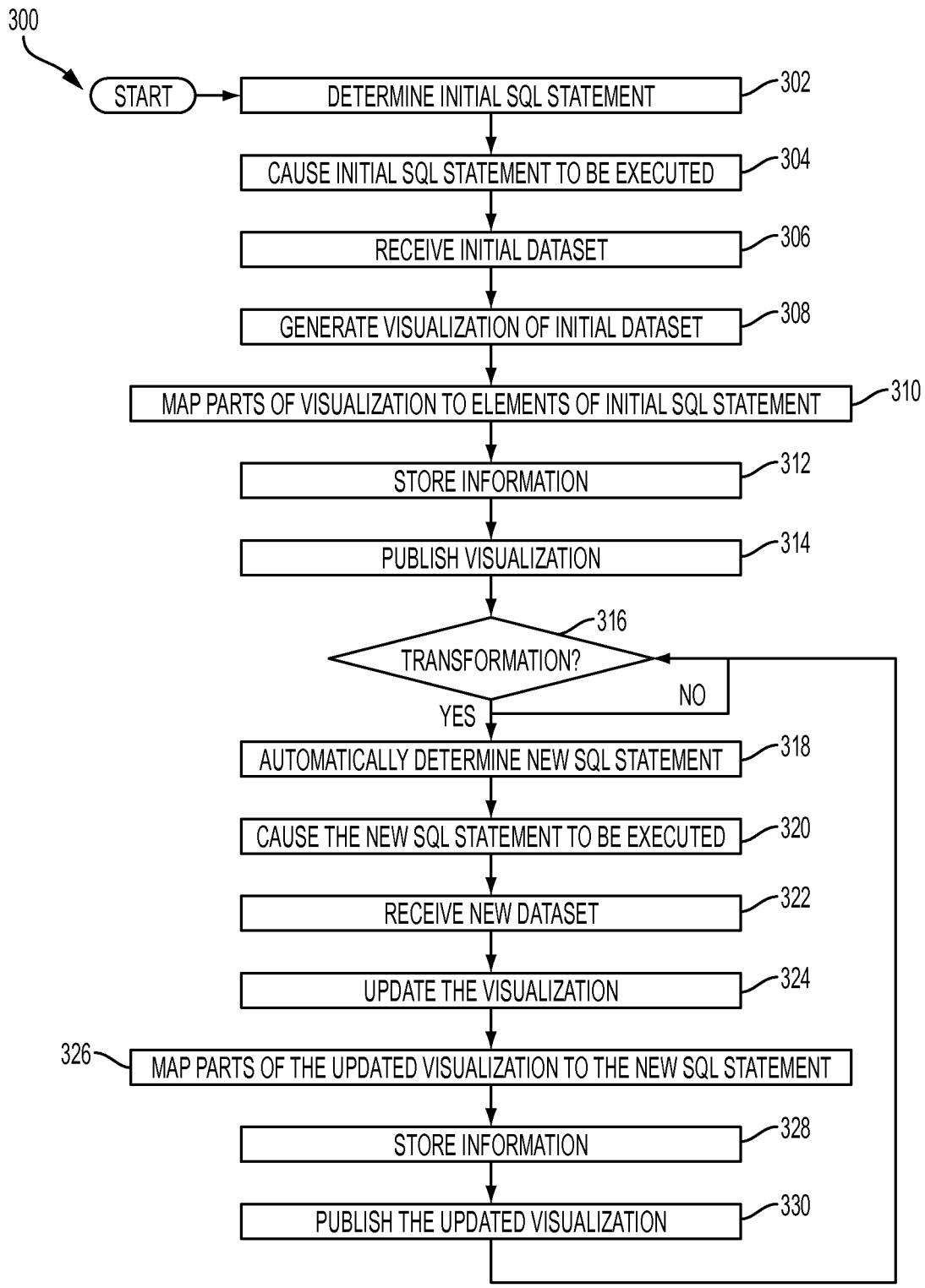
FIG. 3 illustrates a process for performing transformations of datasets.

FIG. 3 presents a flowchart of an example of a process 300 for performing transformations of datasets. In various embodiments, the process 300 can be triggered by the client 102 initiating a session with the database access system 140. The process 300 can be implemented by any system that can access one or more data sources. For example, the process 300, in whole or in part, can be implemented by one or more of the visualization interface 134, the statement builder 136, the database access system 140, the execution engine 142, and/or the database system 110 (or components thereof). Although any number of systems, in whole or in part, can implement the process 300, to simplify discussion, the process 300 will be described in relation to specific systems or subsystems of the computing environment 100.

At block 302, an initial SQL statement which characterizes an initial dataset is determined. In general, the initial SQL statement can be determined, or derived, from user input. In various embodiments, upon initiation of a session with the database access system 140, the initial dataset can be indicated by a user of the client 102 (e.g., by selecting one or more databases from a list of data sources). In these embodiments, the initial SQL statement can be a statement that selects, for example, data from the indicated data sources.

In some cases, the initial dataset can be indicated by the user referencing resultant information from a previous execution of the process 300. For example, the visualization interface 134 can receive a user selection of a particular data transformation, a particular sequence of data transformations, a particular database statement, and/or the like that may be stored in the statement repository 138. In such cases, information corresponding to the user selection can be retrieved from the statement repository 138. Also, in some cases, the initial SQL statement can be directly specified by a database statement provided by the user or retrieved from another network location specified by the user. In addition, or alternatively, the initial SQL statement can correspond to a user-selected option from among a plurality of options configured, for example, by an administrator.

In some embodiments, the initial SQL statement can be a reformatted version of an input SQL statement which results from any of the input or sources described above. For example, in certain embodiments, if the input SQL statement is not any form of union and only contains one referenced table or does not contain any '*' in a SELECT clause, no reformatting of the input SQL statement may be required. The initial SQL statement and the input SQL statement can be one and the same. However, in certain embodiments, if the above criteria is not satisfied, the initial SQL statement can be generated, from the input SQL statement, to conform to the following format: SELECT {columns} FROM ({input SQL statement}) {generated alias}. In various cases, column names can be determined by determining a resulting schema of the input SQL statement.

At block 304, the execution engine 142 causes the initial SQL statement to be executed on the database system 110. For example, the execution engine 142 can pass the initial SQL statement to the database system 110. In some cases, the initial SQL statement can be executed on a data sample (e.g., a random data sample) for the data sources referenced therein. At block 306, the execution engine 142 receives the initial dataset from the database system 110. At block 308, the visualization interface 134 generates a visualization of the dataset. The visualization can be, for example, a tabular visualization that includes a table which further includes a plurality of rows and a plurality of columns. In some embodiments, the block 308 can also include generating profiling data as part of the visualization. In these embodiments, the block 308 can include performing a pattern analysis of the initial dataset. In these embodiments, the block 308 can also include compiling statistics related to values contained in the initial dataset. Such statistics can be included as part of the visualization.

In addition, in certain embodiments, the block 308 can include identifying a recommended data transformation. Examples of recommending a data transformation will be described in more detail with respect to FIGS. 4 and 11. Moreover, in certain embodiments, the block 308 can include accessing, or generating, metadata related to data contained in particular columns. For example, the metadata could indicate, for a particular column, what measurement units correspond to the values contained therein (e.g., miles, kilometers, kilograms, etc.). Other examples will be apparent to one skilled in the art after reviewing the present disclosure.

At block 310, the visualization interface 134, or another component, maps constituent parts of the visualization generated at the block 308 to elements of the initial SQL statement. For example, in various cases, columns of the visualization can be mapped to a clause, expression and/or predicate in which the column is referenced.

At block 312, the initial SQL statement, the visualization, information related to the mapping, metadata and/or other information can be stored in the statement repository 138. In certain embodiments, the new SQL statement (and/or other related information) can thereby be made accessible for selection and retrieval, for example, at block 302 during future iterations of the process 300 by a same or different user. In some embodiments, information related to the initial SQL statement might not be stored. In these embodiments, the block 312 can be omitted. Additionally, in some implementations, storage can be user-initiated such that storage occurs in an ad hoc manner.

At block 314, the visualization interface 134 publishes the visualization to one or more users, for example, by making the visualization of the dataset available to the user over the network 104. In various embodiments, the visualization can be published via one or more webpages, a dashboard, combinations of same, and/or the like.

At decision block 316, the visualization interface 134 determines whether a transformation request has been received. In certain embodiments, the visualization interface 134 can enable the user to select or identify a data transformation in any of the ways described relative to FIG. 1. In general, the data transformation can be expressed without using SQL syntax. If it is determined at the decision block 316 that a data-transformation request has been received, the process 300 proceeds to block 318. Otherwise, the process 300 remains at the decision block 316 until a transformation request is received.

At block 318, the statement builder 136 automatically determines a new SQL statement that is operable, when executed, to return a new dataset which implements the transformation request. In some embodiments, the block 318 can include using the rules repository 144. In general, the block 318 can include adding a clause or expression to a SQL statement which characterizes the visualization currently being operated on by the user. An example of functionality that can be performed at the block 318 will be described with respect to FIGS. 5 and 6. At block 320, the execution engine 142 causes the new SQL statement to be executed on the database system 110. For example, the execution engine 142 can pass the new SQL statement to the database system 110.

At block 322, the execution engine 142 receives the new dataset from the database system 110. At block 324, the visualization interface 134 updates the visualization to be a visualization of the new dataset. In general, the visualization can take the form described above with respect to block 308. In some embodiments, the block 324 can also include generating updated profiling data as part of the visualization.

At block 326, the visualization interface 134, or another component, maps constituent parts of the updated visualization to elements of the new SQL statement. In general, the block 326 can include any of the mapping functionality described above with respect to the block 310.

At block 328, the new SQL statement, the updated visualization, information related to the mapping to the updated visualization, metadata and/or other information can be stored in the statement repository 138 as described above with respect to the block 312. In addition, or alternatively, the block 328 can include allowing the user to select a particular sequence of data transformations, or steps, that have been executed so that information corresponding to the selected steps can be stored.

In certain embodiments, portions of the process 300 can execute repeatedly upon the receipt of each successive transformation request as described, for example, with respect to the decision block 316. In these embodiments, the user can select an individual step among two or more steps, a grouping of two more steps, etc. In such cases, the block 328 can include storing in the statement repository 138 the particular ordering of corresponding data transformations, whichever SQL statement(s) correspond to those corresponding data transformations, related visualization(s), related metadata, combinations of same, and/or the like for later retrieval, for example, during a future execution of the block 302 by a same or different user. In certain embodiments, the stored information can generalize the steps such that they can be applied to similarly formatted data of other datasets (e.g., a data transformation that reformats a date to a particular format, etc.).

At block 330, the visualization interface 134 publishes the updated visualization in a fashion similar to that which is described above with respect to the block 314. From block 330, the process 300 returns to the decision block 316 and proceeds as described above. In general, the process 300 can continue until terminated by the user, automatically when suitable stop criteria is met (e.g., upon the expiration of the session), manually by an administrator or other user, combinations of same, and/or the like. Advantageously, in various embodiments, the process 300 can allow the one or more users to iteratively cleanse and transform the initial dataset via a plurality of data transformations manifested in a plurality of new datasets.

Figure 4:
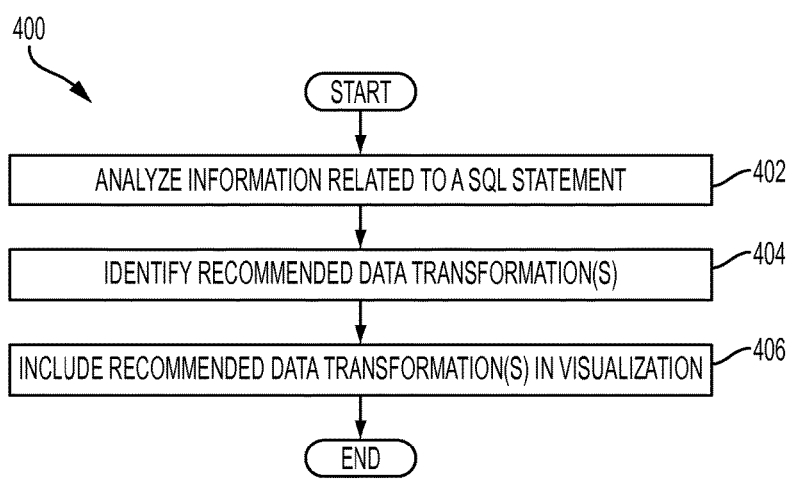
FIG. 4 illustrates a process for identifying recommended data transformations.

FIG. 4 presents a flowchart of an example of a process 400 for identifying recommended data transformations. In various embodiments, the process 400 can be performed as part of the block 308 and/or the block 324 of FIG. 3. The process 400 can be implemented by any system that can access one or more data sources. For example, the process 400, in whole or in part, can be implemented by one or more of the visualization interface 134, the statement builder 136, the database access system 140, the execution engine 142, and/or the database system 110 (or components thereof). Although any number of systems, in whole or in part, can implement the process 400, to simplify discussion, the process 400 will be described in relation to specific systems or subsystems of the computing environment 100.

At block 402, the visualization interface 134 analyzes information related to a SQL statement such as, for example, an initial SQL statement or a new SQL statement as described above relative to the process 300 of FIG. 3, and/or information related to a user of the visualization interface 134. For example, in some implementations, the visualization interface 134 can perform a pattern analysis of a dataset that results from executing the SQL statement. In these implementations, the pattern analysis can yield an identification of one or more patterns. In an example, the pattern could be that a particular column of the dataset contains strings of the form "X (Y)", where X and Y represent a first substring and a second substring, respectively. Additionally, in some implementations, the visualization interface 134 can analyze information related to the user, for example, by determining a location of the user (e.g., via access to directory services, IP address, etc.). The determined location can be, for example, a country or other aspect of the user's locale. Other examples of information that can be analyzed at the block 402 will be apparent to one skilled in the art after reviewing the present disclosure.

At block 404, the visualization interface 134 identifies one or more recommended data transformations based, at least in part, on the analysis conducted at the block 402. In some implementations, recommended data transformations can be rule-based such that whenever particular criteria is met, certain recommendations are made. For instance, continuing the above example in which a particular column contains data of the form "X (Y)", a recommendation could be made to split the particular column into two columns such that the first column contains the first substring and the second column contains the second substring.

Further, continuing the above example in which the user's location is determined, a recommendation could be made to conform data values of particular columns to measurement units most commonly used in the user's location. For example, if data values of a given column are measured in kilometers (as determined from metadata) and the user is located in the United States, a recommendation could be made to convert the data values to miles. Similar recommendations could be made based on currency, temperature, weight, and/or any other information that might be measured or viewed differently depending on location.

At block 406, one or more recommendations are included, for example, as part of a visualization that can be generated, published, and updated as described with respect to the process 300 of FIG. 3. In some implementations, the one or more recommendations may not be published until a user requests recommendations. Additionally, in some cases, if no recommendations result from the block 404, the block 406 can be omitted.

Figure 5:
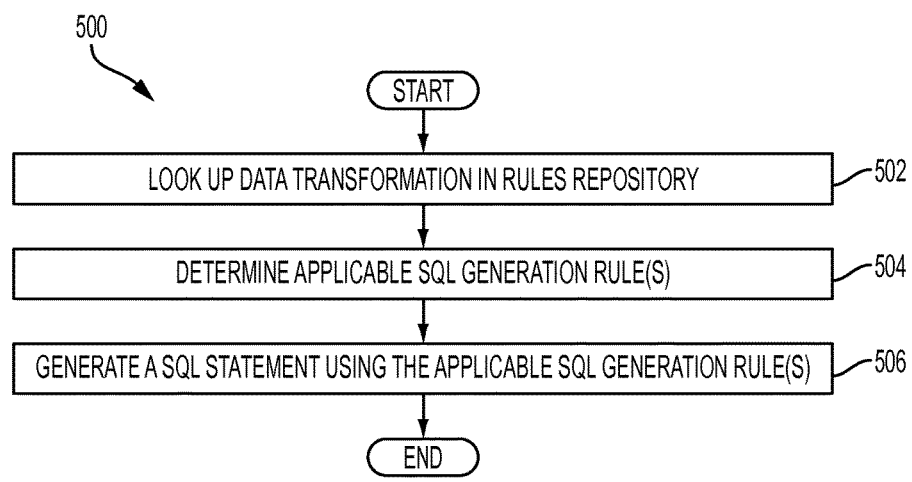
FIG. 5 illustrates a process for automatically determining a Structured Query Language (SQL) statement for a data transformation requested by a user.

FIG. 5 presents a flowchart of an example of a process 500 for automatically determining a SQL statement for a data transformation requested by a user. In various embodiments, the process 500 can be performed as part of the block 318 of FIG. 3. The process 500 can be implemented by any system that can access one or more data sources. For example, the process 500, in whole or in part, can be implemented by one or more of the visualization interface 134, the statement builder 136, the database access system 140, the execution engine 142, and/or the database system 110 (or components thereof). Although any number of systems, in whole or in part, can implement the process 500, to simplify discussion, the process 500 will be described in relation to specific systems or subsystems of the computing environment 100.

At block 502, the statement builder 136 looks up the data transformation in the rules repository 144. In certain embodiments, each data transformation permitted via the visualization interface 134 can be associated with an identifier. In various cases, an identifier associated with the data transformation requested by the user can serve as a lookup key into the rules repository 144. At block 504, the statement builder 136 determines a SQL generation rule that is applicable to the data transformation. For example, the rules repository 144 can include a single rule or multiple rules relating to the data transformation. At block 506, the statement builder 136 generates a SQL statement using the SQL generation rule(s) determined to be applicable.

Figure 6A:
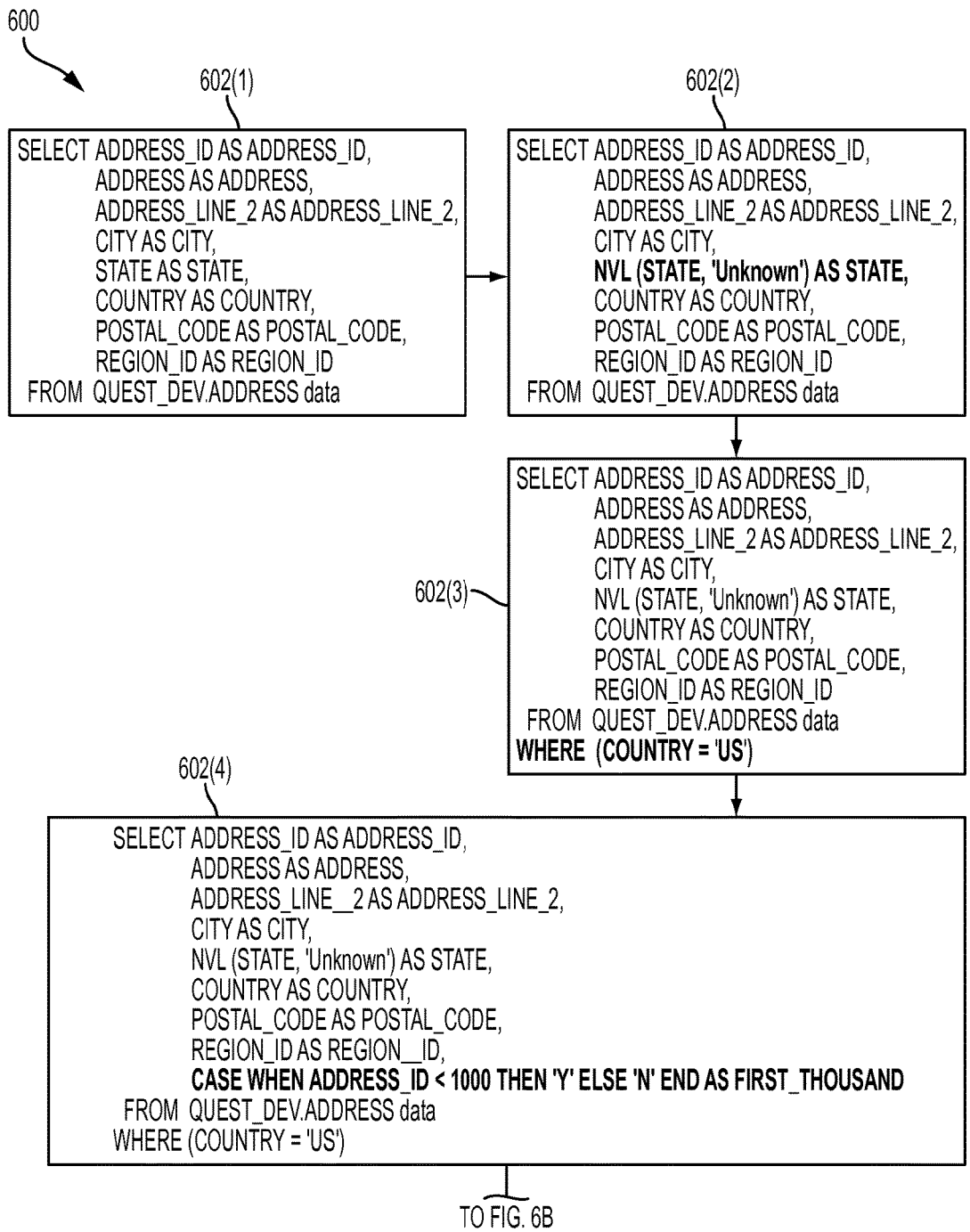

FIGS. 6A-C illustrate an example progression 600 of SQL statements using methods described with respect to FIGS. 3-5. For illustrative purposes, the example progression 600 uses Oracle. In particular, FIGS. 6A-C depict a first SQL statement 602(1), a second SQL statement 602(2), a third SQL statement 602(3), a fourth SQL statement 602(4), a fifth SQL statement 602(5), and a sixth SQL statement 602(6) (collectively, SQL statements 602). The first SQL statement 602(1) can be an initial SQL statement that is determined, for example, as described with respect to the block 302 of FIG. 3. In the illustrated embodiment, the first SQL statement 602(1) is operable, when executed, to return an example first (or initial) dataset that includes a listing of address information.

Figure 7:
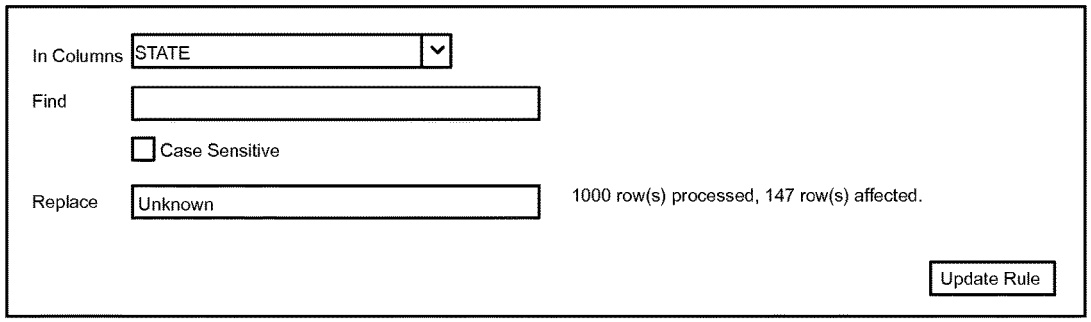

An example of a data transformation that could be user selected and applied to the first dataset is a find-and-replace operation. For example, the first dataset could periodically include null values in a column thereof corresponding to STATE. FIG. 7 illustrates an example rule format 700 for the find-and-replace operation, which could be contained within the rules repository 144. The example rule format 700 expresses a find-and-replace operation designed to replace each instance of a blank (i.e., null value) in a particular column (i.e., STATE) with "UNKNOWN."

The second SQL statement 602(2) is an example of a new SQL statement that can result from implementing a rule of the rule format 700. In particular embodiments, the rule format 700 can be mapped to utilization of an NVL function of Oracle such that null values are replaced with text of a "Replace" field. In various cases, the replacement text can be provided by the user. As shown, the second SQL statement 602(2) expresses the NVL function in place within the SELECT clause. It should be appreciated that the second SQL statement 602(2) is operable, when executed, to return a second dataset that implements the find-and-replace operation.

Figure 8:
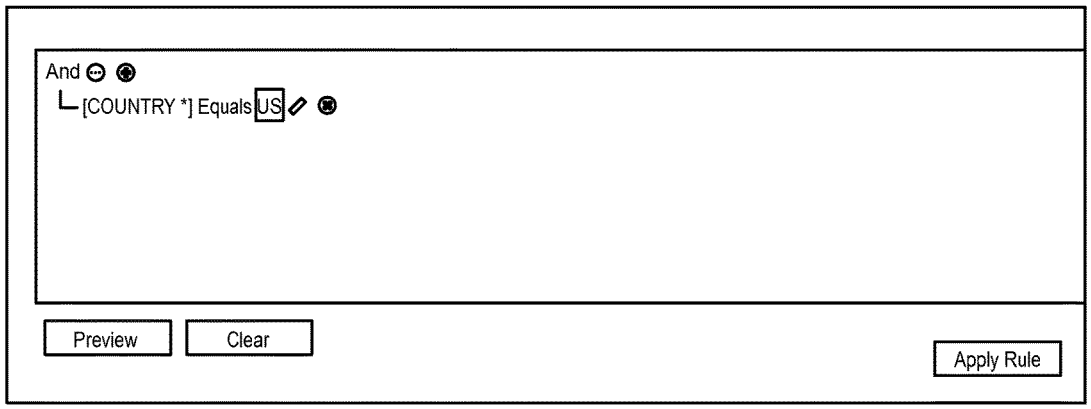

Continuing the example of FIGS. 6A-C, an example of a data transformation that could be user selected and applied to the second dataset is a filter operation that filters out addresses outside the United States so that only addresses within the United States are retained. FIG. 8 illustrates an example rule format 800. The example rule format 800 expresses a filter operation designed to filter the second dataset to only include addresses within the United States.

The third SQL statement 602(3) is an example of a new SQL statement that can result from implementing a rule of the rule format 800. In particular embodiments, the rule format 800 can be mapped to utilization of a WHERE clause that implements a filter condition (e.g., filter out non-US addresses). In various cases, the filter condition can be provided by the user via a graphical user interface. As shown, the third SQL statement 602(3) expresses the filter condition within a new WHERE clause that is added to the second SQL statement 602(2). It should be appreciated that the third SQL statement 602(3) is operable, when executed, to return a third dataset that implements the filter operation.

Continuing the example of FIGS. 6A-C, an example of a data transformation that could be user selected and applied to the third dataset is a calculation which results in a new column. FIG. 9 illustrates an example rule format 900 that adds a calculated column of "FIRST_THOUSAND." In particular, as illustrated and populated, the example rule format 900 is designed to add a column that is populated with 'Y' if an ADDRESS_ID is less than one thousand and with 'N' otherwise.

The fourth SQL statement 602(4) is an example of a new SQL statement that can result from implementing a rule of the rule format 900. In particular embodiments, the rule format 900 can be mapped to utilization of a conditional expression. As shown, the fourth SQL statement 602(4) adds a CASE expression, within the SELECT clause, that implements the calculated column described above. In this fashion, the fourth SQL statement 602(4) represents a modification of the third SQL statement 602(3). It should be appreciated that the fourth SQL statement 602(4) is operable, when executed, to return a fourth dataset that includes the calculated column.

Figure 10A:

Continuing the example of FIGS. 6A-C, an example of a data transformation that could be user selected and applied to the fourth dataset is a filter operation based on the calculated column (i.e., "FIRST_THOUSAND"). FIG. 10A illustrates an example rule format 1000. The example rule format 1000 expresses a filter operation designed to filter the fourth dataset to only include records for which the FIRST_THOUSAND column has the value of 'Y.'

The fifth SQL statement 602(5) is an example of a new SQL statement that can result from implementing a rule of the rule format 1000. In particular embodiments, the rule format 1000 can be mapped to utilization of a subquery in combination with a WHERE clause that implements a filter condition (e.g., FIRST_THOUSAND equals 'Y'). In various cases, the filter condition can be provided by the user via a graphical user interface.

As shown, the fifth SQL statement 602(5) includes a SELECT clause that defines a format of a fifth dataset, a FROM clause, and a WHERE clause. The FROM clause of the fifth SQL statement 602(5) includes the fourth SQL statement 602(4) as a subquery. In addition, the filter condition that FIRST_THOUSAND should equal 'Y' is implemented within the WHERE clause. It should be appreciated that the fifth SQL statement 602(5) is operable, when executed, to return the fifth dataset, which dataset implements the filter operation.

Advantageously, in certain embodiments, usage of a subquery as described with respect to the fifth SQL statement 602(5) can result from implementation of a default rule when no other rule of the rules repository 144 is applicable. In that way, a SQL statement which characterizes a current visualization published to the user can be made a subquery, for example, within a FROM clause of a new SQL statement. Thereafter, other clauses (e.g., the SELECT clause and the WHERE clause) can implement a user-selected data transformation.

Figure 10B:

Continuing the example of FIGS. 6A-C, an example of a data transformation that could be user selected and applied to the fifth dataset is an aggregation operation which results in a new column. FIG. 10B illustrates an example rule format 1050 that adds a column of "AVERAGE." In particular, as illustrated and populated, the example rule format 1050 is designed to add a column that is populated with an average of values contained in a particular column, i.e., the REGION_ID column for purposes of this example. Additionally, as shown, the example rule format 1050 allows users to enter simplified input as may be typical of a spreadsheet software application. In some embodiments, the simplified input can also be expressed in other ways such as, for example, via graphical selection of a column and a corresponding display item on a graphical user interface display item (e.g., a toolbar button, a context-menu item, etc.). As described below, via an automatically generated SQL statement, a mapping can be maintained between a form of the simplified input and underlying data.

Specifically, the sixth SQL statement 602(6) is an example of a new SQL statement that can result from implementing a rule of the rule format 1050. In particular embodiments, for purposes of automatic SQL generation, the rule format 1050 can be mapped to SQL syntax which computes an average using subqueries. As shown, the sixth SQL statement 602(6) adds a column of "AVERAGE" to the SELECT clause of the fifth SQL statement 602(5). The AVERAGE column, and corresponding aggregation operation, can be automatically expressed as a first subquery which indicates an average operation on the REGION_ID column. As shown, a second subquery can be nested within a FROM clause of the first subquery so that the average operation is expressed in terms of the immediately prior statement (i.e., the fifth SQL statement 602(5)). In this fashion, the sixth SQL statement 602(6) represents a modification of the fifth SQL statement 602(5). It should be appreciated that the sixth SQL statement 602(6) is operable, when executed, to return a sixth dataset that includes the AVERAGE column.

Figure 11:
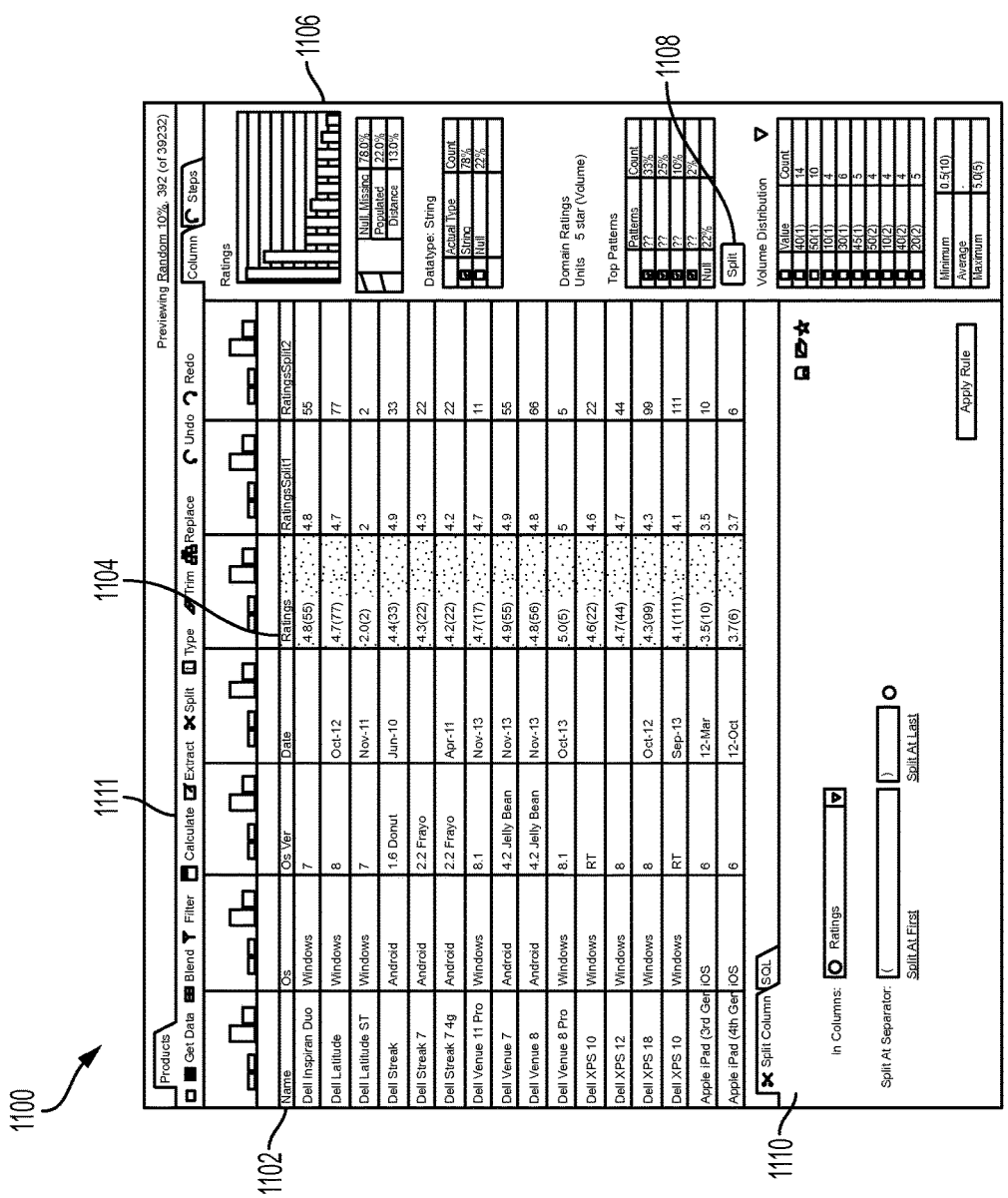

FIG. 11 illustrates an example of a tabular visualization 1100 that can be generated, published, and updated as described, for example, with respect to FIG. 3. The tabular visualization 1100 includes a table 1102. In addition, the tabular visualization 1100 includes profiling information 1106 for a user-selected column 1104 of the table 1102. The profiling information 1106 can result, for example, from block 308 of FIG. 3, block 324 of FIG. 3, and/or the process 400 of FIG. 4. Moreover, the tabular visualization 1100 includes a toolbar 1111 that permits the user to indicate, or select, particular data transformations.

More particularly, the profiling information 1106 includes a data-transformation recommendation 1108 that the user-selected column 1104 be split into two columns. In the illustrated embodiment, the data-transformation recommendation 1108 results from identification of a pattern in the user-selected column 1104 (i.e., a pattern of the form X (Y) as described above with respect to FIG. 4). An action pane 1110 includes particulars of the data-transformation recommendation 1108. Further, the action pane 1110 includes pre-filled inputs and permits the user to authorize performance of the data-transformation recommendation 1108.

Figure 12:
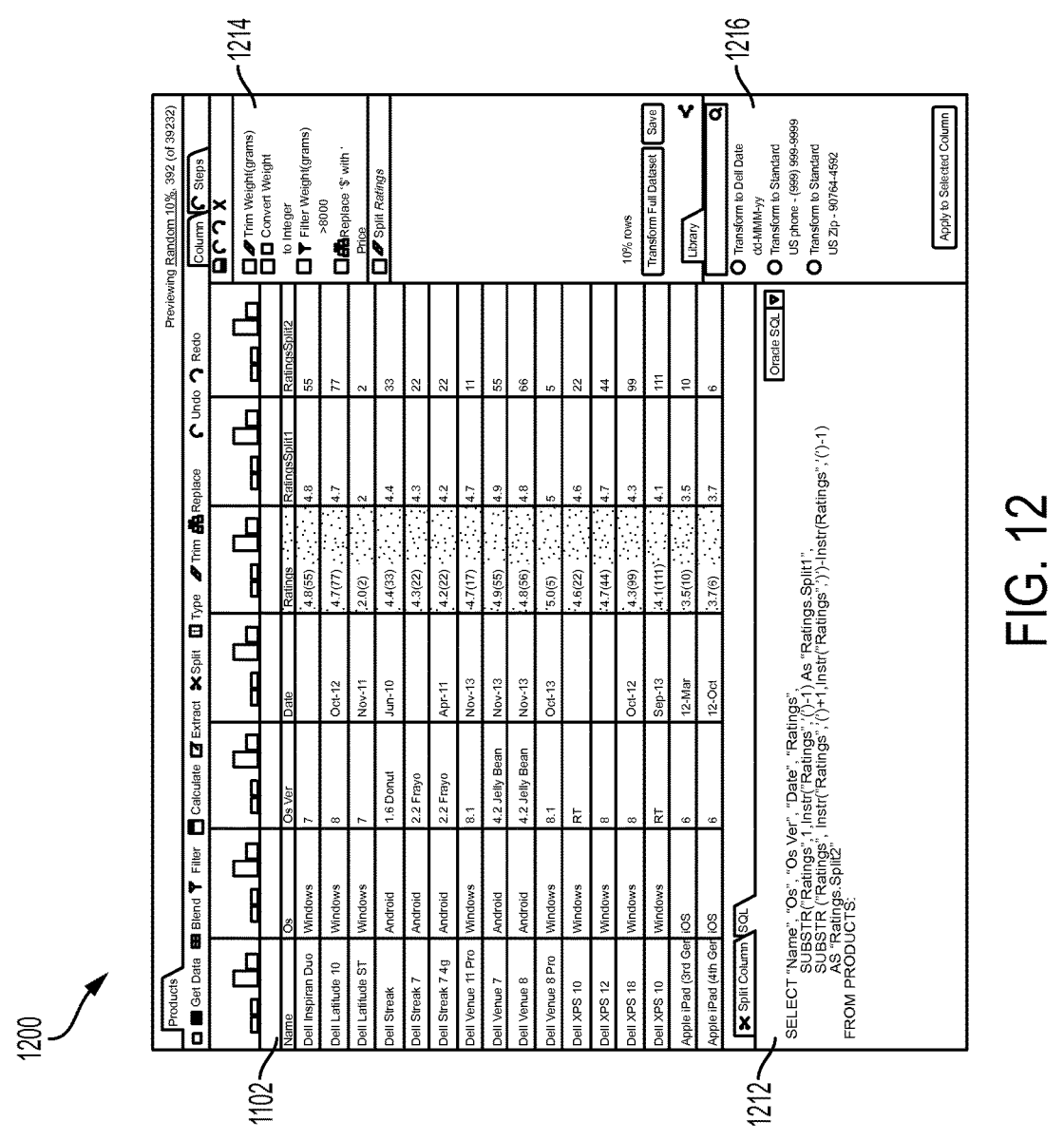

FIG. 12 illustrates an example of a tabular visualization 1200. The tabular visualization 1200 includes the table 1102 of FIG. 11, a SQL statement view 1212, a steps view 1214, and a steps library view 1216. The SQL statement view 1212 can show a current SQL statement which characterizes the tabular visualization 1200 and, in particular, the table 1102. The steps view 1214 can illustrate a sequence of steps that have been executed in a current session. In certain embodiments, the sequence of steps (and corresponding information such as SQL statement, metadata, profiling information, etc.) can be saved, or stored, to the statement repository 138. The steps library view 1216 illustrates an example of previously stored steps, or data transformations, which may be stored in the statement repository 138. As shown, the steps of the steps library view 1216 can be selected and applied to a dataset represented in the table 1102. In particular embodiments, the steps of the steps library view 1216 are generalized steps such that they can be applied to any data of a particular format and are not specific to a particular dataset.

Figure 13:
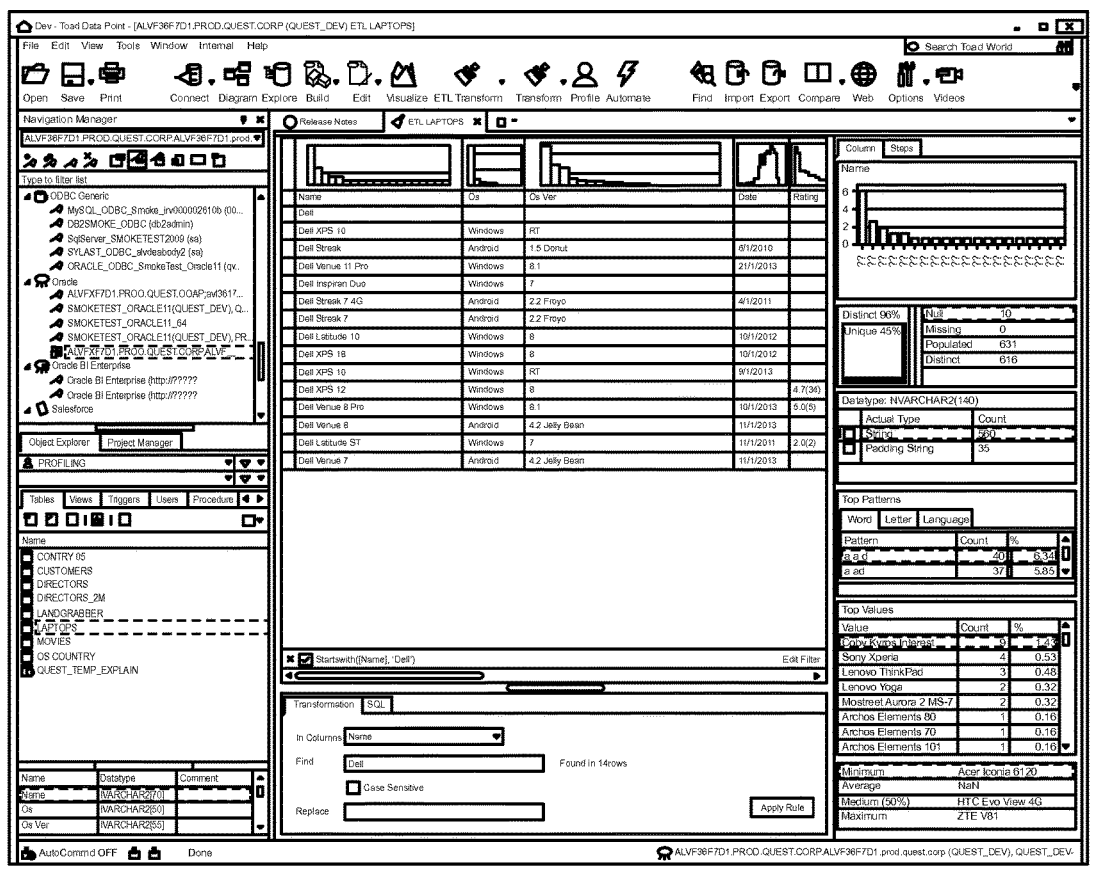

FIG. 13 illustrates an example of a tabular visualization 1300 that can be generated, published, and updated as described, for example, with respect to FIG. 3. As shown, the tabular visualization 1300 includes profiling information and permits the user to select, or indicate, data transformations. In addition, the tabular visualization 1300 illustrates connections to multiple databases (top left) and selection of datasets (bottom left).

Depending on the embodiment, certain acts, events, or functions of any of the algorithms described herein can be performed in a different sequence, can be added, merged, or left out altogether (e.g., not all described acts or events are necessary for the practice of the algorithms). Moreover, in certain embodiments, acts or events can be performed concurrently, e.g., through multi-threaded processing, interrupt processing, or multiple processors or processor cores or on other parallel architectures, rather than sequentially. Although certain computer-implemented tasks are described as being performed by a particular entity, other embodiments are possible in which these tasks are performed by a different entity.

Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

While the above detailed description has shown, described, and pointed out novel features as applied to various embodiments, it will be understood that various omissions, substitutions, and changes in the form and details of the devices or algorithms illustrated can be made without departing from the spirit of the disclosure. As will be recognized, the processes described herein can be embodied within a form that does not provide all of the features and benefits set forth herein, as some features can be used or practiced separately from others. The scope of protection is defined by the appended claims rather than by the foregoing description. All changes which come within the meaning and range of equivalency of the claims are to be embraced within their scope.

What is claimed is:

1. A method comprising, by a computer system:
   receiving a data-transformation request in relation to a visualization of a first dataset, wherein the visualization represents columns of data, wherein the data-transformation request expresses at least one transformation of the first dataset without using Structured Query Language (SQL) syntax, wherein the visualization is characterized by a first SQL statement maintained by the computer system, wherein the columns of the visualization are mapped to constituent parts of the first SQL statement in which the columns are referenced;
   automatically determining a second SQL statement configured to return a second dataset, wherein the second dataset implements the at least one transformation of the first dataset, the automatically determining comprising:
   looking up an identifier of the at least one transformation in a repository;
   responsive to a determination that there exists, in the repository for the identifier, an applicable SQL generation rule other than a default rule, automatically building the second SQL statement based, at least in part, on the mapping of the visualization to the constituent parts of the first SQL statement, using SQL syntax specified by the applicable SQL generation rule; and
   responsive to a determination that there does not exist, in the repository for the identifier, an applicable SQL generation rule other than the default rule, automatically building the second SQL statement based, at least in part, on the mapping of the visualization to the constituent parts of the first SQL statement, using SQL syntax specified by the default rule, the building comprising including the first SQL statement as a subquery in a clause of the second SQL statement;
   causing the second SQL statement to be executed on one or more databases;
   receiving the second dataset in response to the causing; and
   updating the visualization to reflect the second dataset.

2. The method of claim 1, comprising, prior to the receiving of the second dataset:
   determining the first SQL statement;
   causing the first SQL statement to be executed on the one or more databases;
   receiving, in response to the causing, the first dataset;
   generating the visualization;
   mapping parts of the visualization to elements of the first SQL statement; and
   publishing the visualization to a user.

3. The method of claim 1, comprising publishing the updated visualization to a user.

4. The method of claim 1, comprising:
   storing the second SQL statement;
   retrieving the second SQL statement upon user request during a subsequent session;
   causing the second SQL statement to be executed on the one or more databases;
   receiving the second dataset;
   generating a subsequent visualization of the second dataset; and
   publishing the subsequent visualization to a requesting user.

5. The method of claim 1, comprising:
   mapping parts of the updated visualization to elements of the second SQL statement;
   receiving a subsequent data-transformation request in relation to the visualization, wherein the data-transformation request expresses at least one transformation of the second dataset using non-SQL syntax;
   automatically determining based, at least in part, on a result of the mapping, a third SQL statement configured to return a third dataset, wherein the third dataset implements the at least one transformation of the second dataset;
   causing the third SQL statement to be executed on the one or more databases;
   receiving, in response to the causing of the third SQL statement to be executed, the third dataset; and
   updating the visualization to reflect the third dataset.

6. The method of claim 1, wherein the building comprises adding at least one of a clause and an expression to the first SQL statement.

7. The method of claim 1, comprising:
prior to the receiving of the data-transformation request, performing a pattern analysis of the first dataset;
identifying a recommended data transformation based, at least in part, on the pattern analysis; and
publishing the recommended data transformation to a user in relation to the visualization of the first dataset; and
wherein the at least one transformation comprises the recommended data transformation.

8. The method of claim 1, comprising:
prior to the receiving, determining a locale of a user;
identifying a recommended data transformation based, at least in part, on the locale;
publishing the recommended data transformation to the user in relation to the visualization of the first dataset; and
wherein the at least one transformation comprises the recommended data transformation.

9. The method of claim 5, comprising:
publishing the at least one transformation of the first dataset and the at least one transformation of the second dataset as a sequence of steps;
allowing a user to select one or more of the sequence of steps for storage;
responsive to user selection of at least one step of the sequence of steps, determining a SQL statement which corresponds to the at least one step; and
storing the determined SQL statement which corresponds to the at least one step for later retrieval.

10. An information handling system comprising at least one processor, wherein the at least one processor is configured to implement a method comprising:
receiving a data-transformation request in relation to a visualization of a first dataset, wherein the visualization represents columns of data, wherein the data-transformation request expresses at least one transformation of the first dataset without using Structured Query Language (SQL) syntax, wherein the visualization is characterized by a first SQL statement maintained by the information handling system, wherein the columns of the visualization are mapped to constituent parts of the first SQL statement in which the columns are referenced;
automatically determining a second SQL statement configured to return a second dataset, wherein the second dataset implements the at least one transformation of the first dataset, the automatically determining comprising:
looking up an identifier of the at least one transformation in a repository;
responsive to a determination that there exists, in the repository for the identifier, an applicable SQL generation rule other than a default rule, automatically building the second SQL statement based, at least in part, on the mapping of the visualization to the constituent parts of the first SQL statement, using SQL syntax specified by the applicable SQL generation rule; and
responsive to a determination that there does not exist, in the repository for the identifier, an applicable SQL generation rule other than the default rule, automatically building the second SQL statement based, at least in part, on the mapping of the visualization to the constituent parts of the first SQL statement, using SQL syntax specified by the default rule, the building comprising including the first SQL statement as a subquery in a clause of the second SQL statement;
causing the second SQL statement to be executed on one or more databases;
receiving the second dataset in response to the causing; and
updating the visualization to reflect the second dataset.

11. The information handling system of claim 10, the method comprising, prior to the receiving of the second dataset:
determining the first SQL statement;
causing the first SQL statement to be executed on the one or more databases;
receiving, in response to the causing, the first dataset;
generating the visualization;
mapping parts of the visualization to elements of the first SQL statement; and
publishing the visualization to a user.

12. The information handling system of claim 10, the method comprising publishing the updated visualization to a user.

13. The information handling system of claim 10, the method comprising:
storing the second SQL statement;
retrieving the second SQL statement upon user request during a subsequent session;
causing the second SQL statement to be executed on the one or more databases;
receiving the second dataset;
generating a subsequent visualization of the second dataset; and
publishing the subsequent visualization to a requesting user.

14. The information handling system of claim 10, the method comprising:
mapping parts of the updated visualization to elements of the second SQL statement;
receiving a subsequent data-transformation request in relation to the visualization, wherein the data-transformation request expresses at least one transformation of the second dataset using non-SQL syntax;
automatically determining based, at least in part, on a result of the mapping, a third SQL statement configured to return a third dataset, wherein the third dataset implements the at least one transformation of the second dataset;
causing the third SQL statement to be executed on the one or more databases;
receiving, in response to the causing of the third SQL statement to be executed, the third dataset; and
updating the visualization to reflect the third dataset.

15. The information handling system of claim 10, the method comprising:
prior to the receiving of the data-transformation request, performing a pattern analysis of the first dataset;
identifying a recommended data transformation based, at least in part, on the pattern analysis; and
publishing the recommended data transformation to a user in relation to the visualization of the first dataset; and
wherein the at least one transformation comprises the recommended data transformation.

16. The information handling system of claim 14, the method comprising:
publishing the at least one transformation of the first dataset and the at least one transformation of the second dataset as a sequence of steps;

allowing a user to select one or more of the sequence of steps for storage;

responsive to user selection of at least one step of the sequence of steps, determining a SQL statement which corresponds to the at least one step; and storing the determined SQL statement which corresponds to the at least one step for later retrieval.

17. A computer-program product comprising a non-transitory computer-usable medium having computer-readable program code embodied therein, the computer-readable program code adapted to be executed to implement a method comprising:

receiving a data-transformation request in relation to a visualization of a first dataset, wherein the visualization represents columns of data, wherein the data-transformation request expresses at least one transformation of the first dataset without using Structured Query Language (SQL) syntax, wherein the visualization is characterized by a first SQL statement maintained by a computer system, wherein the columns of the visualization are mapped to constituent parts of the first SQL statement in which the columns are referenced;

automatically determining a second SQL statement configured to return a second dataset, wherein the second dataset implements the at least one transformation of the first dataset, the automatically determining comprising:

looking up an identifier of the at least one transformation in a repository;

responsive to a determination that there exists, in the repository for the identifier, an applicable SQL generation rule other than a default rule, automatically building the second SQL statement based, at least in part, on the mapping of the visualization to the constituent parts of the first SQL statement, using SQL syntax specified by the applicable SQL generation rule; and responsive to a determination that there does not exist, in the repository for the identifier, an applicable SQL generation rule other than the default rule, automatically building the second SQL statement based, at least in part, on the mapping of the visualization to the constituent parts of the first SQL statement, using SQL syntax specified by the default rule, the building comprising including the first SQL statement as a subquery in a clause of the second SQL statement;

causing the second SQL statement to be executed on one or more databases;

receiving the second dataset in response to the causing; and updating the visualization to reflect the second dataset.

* * * * *